US009369428B2

(12) United States Patent
Nadler et al.

(10) Patent No.: US 9,369,428 B2
(45) Date of Patent: Jun. 14, 2016

(54) SYSTEMS AND METHODS FOR ASSIGNING INTERNET PROTOCOL ADDRESSES (71) Applicant: Verizon Patent and Licensing Inc., Basking Ridge, NJ (US)

(72) Inventors: Moses Matthew Nadler, Chester, NJ (US); John R. Schommer, Long Valley, NJ (US)

(73) Assignee: VERZION PATENT AND LICENSING INC., Basking Ridge, NJ (US)

(*) Notice: Subject to any disclaimer, the term of this patent is extended or adjusted under 35 U.S.C. 154(b) by 667 days.

(21) Appl. No.: 13/628,252

(22) Filed: Sep. 27, 2012

(65) Prior Publication Data
US 2014/0089491 A1    Mar. 27, 2014

(51) Int. Cl.
*G06F 15/16* (2006.01)
*H04L 29/12* (2006.01)

(52) U.S. Cl.
CPC .......... *H04L 61/203* (2013.01); *H04L 61/2053* (2013.01)

(58) Field of Classification Search
None
See application file for complete search history.

(56) References Cited

U.S. PATENT DOCUMENTS

| 7,096,273 | B1* | 8/2006 | Meier ..................... G06F 15/16 |
| 8,218,502 | B1* | 7/2012 | Liu et al. ........... H04W 36/0011 |
| 8,291,111 | B1* | 10/2012 | Kinnear et al. ..... G06F 11/2035 |
| 8,312,270 | B1* | 11/2012 | Chou et al. ............... H04L 9/32 |
| 2004/0042446 | A1* | 3/2004 | Koch et al. .............. H04L 12/66 |
| 2009/0041004 | A1* | 2/2009 | Emmanuel ........ H04L 12/40045 |
| 2011/0023093 | A1* | 1/2011 | Small et al. ....... H04L 29/12283 |
| 2012/0023153 | A1* | 1/2012 | Karasaridis ............. G06F 15/16 |
| 2012/0099586 | A1* | 4/2012 | Cherian et al. .......... H04L 12/56 |
| 2013/0104026 | A1* | 4/2013 | Reynar et al. ........... G06F 15/16 |

* cited by examiner

*Primary Examiner* — Chris Parry
*Assistant Examiner* — Soe M Hlaing (57) ABSTRACT

A network device is configured to receive a request, from a user device, for an IP address; assign the IP address to the user device; assign an amount of time that the IP address may be used by the user device; send the IP address to the user device; determine that the amount of time has expired; determine that the user device is idle; assign a new IP address to the user device after the amount of time has expired and when the user device is idle; send the new IP address to the user device; and assign a new amount of time that the new IP address may be used by the user device.

20 Claims, 9 Drawing Sheets

| DEVICE IDENTIFIER | CIRCUIT ID | IP ADDRESS | TIME REMAINING |
|---|---|---|---|
| ROUTER123 | 23.HCGS.134.CD | 240.120.202.121 | 4 HOURS, 0 MINUTES, 0 SECONDS |
| ROUTER456 | 23.HCGS.354.CD | 240.120.202.128 | 2 HOURS, 15 MINUTES, 30 SECONDS |
| ROUTER789 | 23.HCGS.565.CD | 240.120.202.124 | 0 HOURS, 0 MINUTES, 0 SECONDS |
| ... | ... | ... | ... |

ACCESS DEVICE FIELD 402
CIRCUIT IDENTIFIER FIELD 403
IP ADDRESS FIELD 404
TIME COUNTER FIELD 406

SYSTEMS AND METHODS FOR ASSIGNING INTERNET PROTOCOL ADDRESSES

BACKGROUND

When a user decides to communicate through a network (e.g., the Internet) by using a user device, the user device may require an Internet Protocol (IP) address. Once the user device is assigned an IP address, the user device may communicate, via the network, with websites and other types of content providers.

DETAILED DESCRIPTION OF PREFERRED EMBODIMENTS

The following detailed description refers to the accompanying drawings. The same reference numbers in different drawings may identify the same or similar elements.

Systems and/or methods described herein may assign an IP address. The IP address may be used for an amount of time, until the amount of time expires. For example, an IP address may be assigned to a user device. The IP address may also be assigned an amount of time that the IP address may be used by the user device. The user device may use the IP address. After the amount of time expires, a new IP address may be assigned to the user device.

Figure 1:
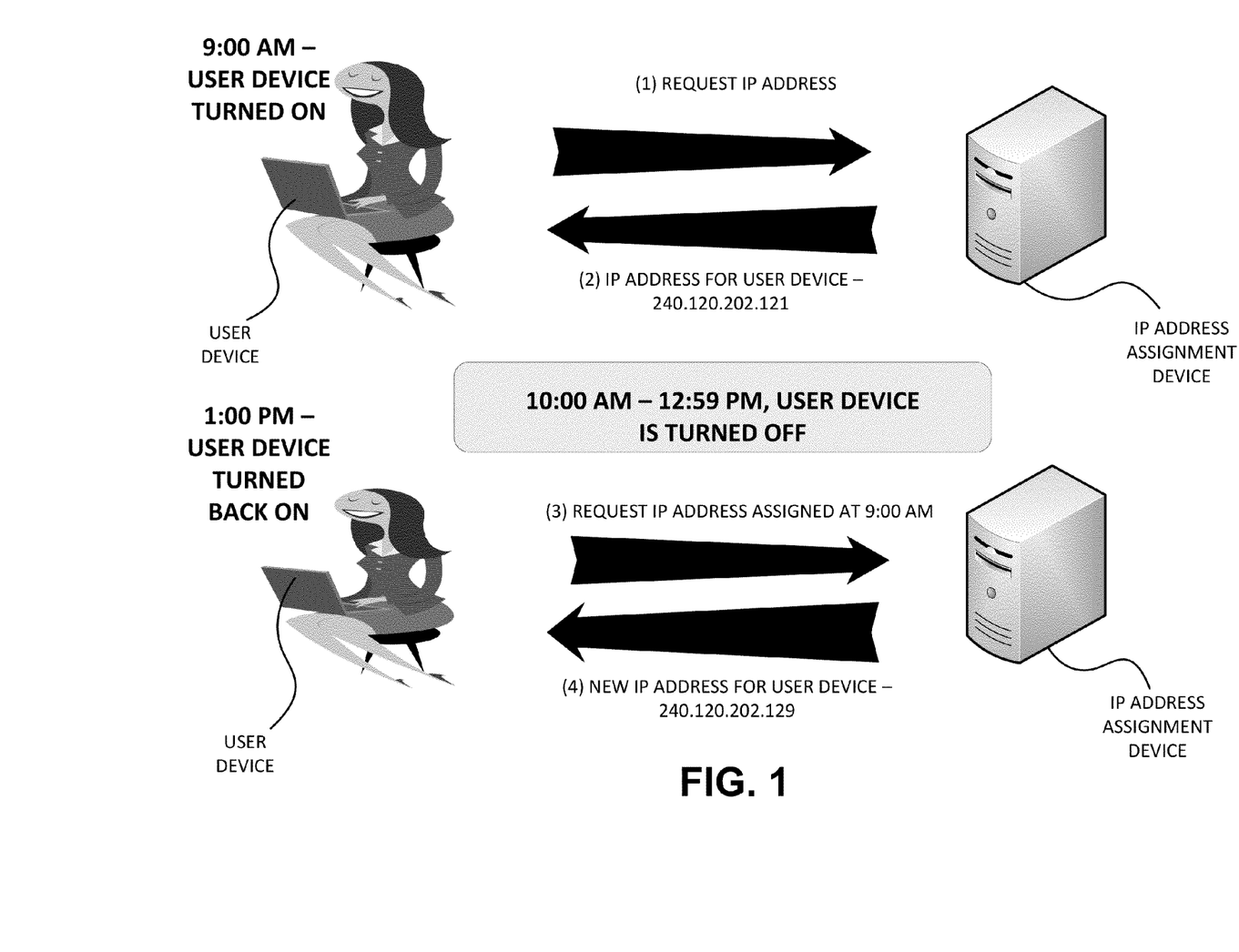
FIG. 1 is a diagram of an overview of an implementation described herein.

FIG. 1 is a diagram of an overview of an implementation described herein. FIG. 1 shows a user device and an IP address assignment device. In practice, there may be additional, or fewer, user devices and/or IP address assignment devices. As shown in FIG. 1, a user ("Susan"), of the user device, may want to access websites through a network, such as the Internet. At 9:00 a.m., Susan decides to connect to the Internet. For Susan to access the Internet, the user device may require an IP address. The user device may send a request for an IP address (see communication (1)) to the IP address assignment device. The IP address assignment device may receive the request and assign an IP address (e.g., 240.120.202.121) to the user device (see communication (2)). The IP address assignment device may also assign an amount of time that the IP address may be used by the user device. For example, the amount of time could be three hours. After three hours, the IP address assignment device may assign a new IP address to the user device. The user device may now use the IP address to allow the user to access websites on the Internet. At 10:00 a.m., Susan decides to do something else, and turns off the user device.

At 1:00 p.m., Susan decides to turn back on the user device and would like to again access websites via the Internet. For Susan to connect back to the Internet, the user device may require an IP address. The user device may send a request for an IP address to the IP address assignment device (see communication (3)). The user device may attempt to obtain the same IP address that was assigned to the user device at 9:00 a.m. (i.e., 240.120.201.121). The IP address assignment device may receive the request, but does not assign the same IP address. The IP address assignment device may determine that the amount of time, associated with the IP address, expired at 12:00 p.m. Instead, the IP address assignment device may assign a new IP address to the user device and send the new IP address to the user device (see communication (4)). With the new IP address, Susan may again visit her favorite websites by using the user device, where the user device is now utilizing the new IP address.

As a result of limiting the amount of time that the IP address can be used, a third party may be prevented from performing techniques (e.g., such as IP address matching and/or a trace route) to determine the location and/or the identity of the user. Changing the IP address may prevent the third party from tracking the behavior of a user over time, and prevent third parties from targeting the user with unwanted advertising (such as banner ads on websites, and/or pop-up advertisements) on websites that the user may access. Further, this may enhance the privacy and security of the user, by preventing third parties from discovering the location and/or identity of the user.

Figure 2:
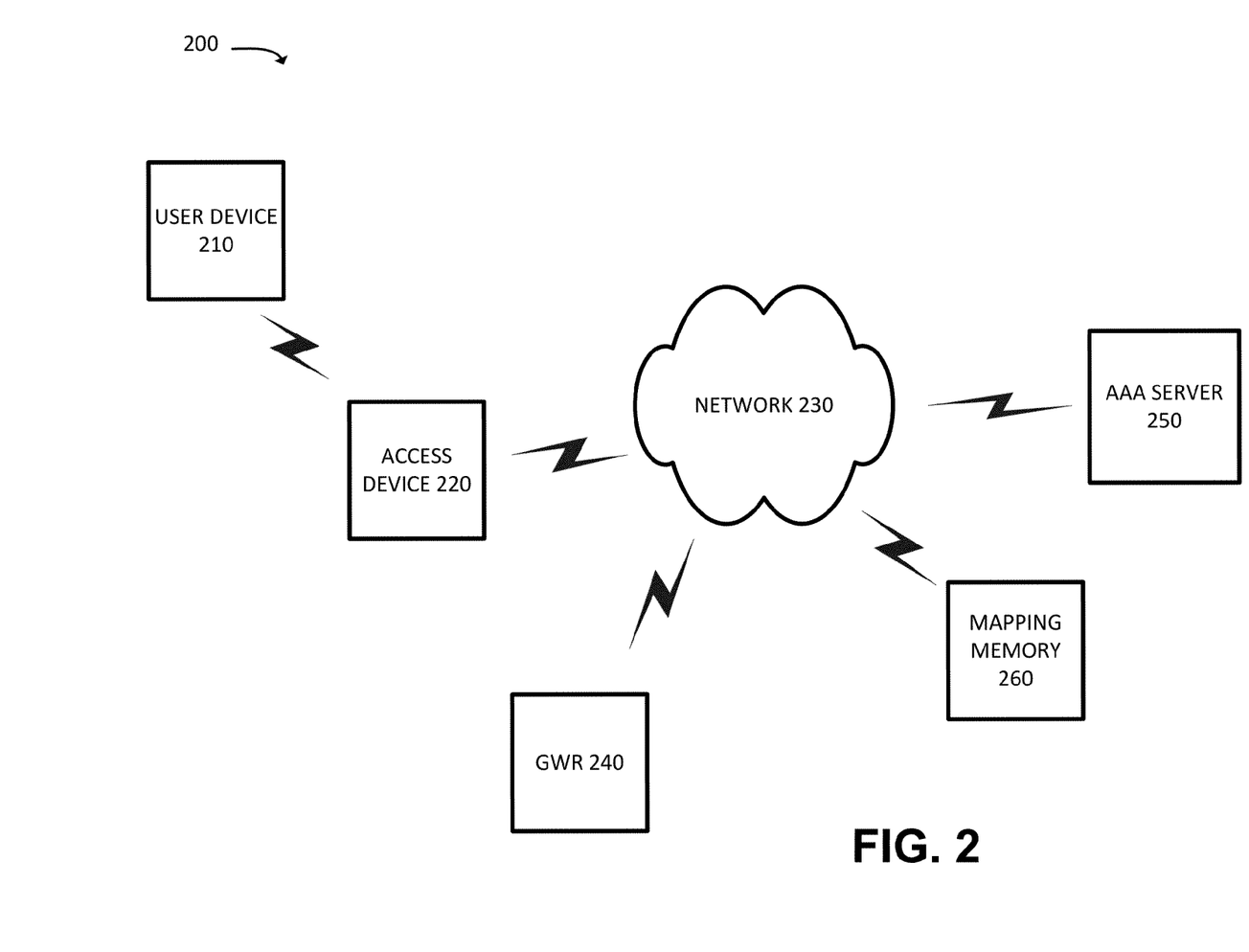
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, an access device 220, a network 230, a gateway router 240 (hereinafter referred to as "GWR 240"), an authentication, authorization, and accounting server 250 (hereinafter referred to as "AAA server 250"), mapping memory 260, and a device 270. The quantity of user devices, access devices, routers, servers, memories, devices, and/or networks, illustrated in FIG. 2 is provided for explanatory purposes only. In practice, there may be additional user devices, access devices, routers, servers, memories, devices, and/or networks; fewer user devices, access devices, routers, servers, memories, devices, and/or networks; different user devices, access devices, routers, servers, memories, devices, and/or networks; or differently arranged user devices, access devices, routers, servers, memories, devices, and/or networks, than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

User device 210 may include any computation or communication device, such as a communication device that is capable of communicating with a network (e.g., network 230). For example, user device 210 may include a radiotelephone, a personal communications system (PCS) terminal (e.g., that may combine a cellular radiotelephone with data processing and data communications capabilities), a personal digital assistant (PDA) (e.g., a radiotelephone and/or a pager with Internet/intranet access), a smart phone, a computer, a laptop, a tablet computer, a camera, a personal gaming system, a set top box, a television, a mobile device, or any other computation or communication device.

In some implementations, user device 210 may be associated with a name. The name, for user device 210, may be a domain name (e.g., www.device123.com), an alias (e.g., device 123), an identifier (e.g., a mobile device number (MDN)), or any other type of name and/or identifier.

In some implementations, user device 210 may be associated with an IP address. The IP address may be IP version 4 (IPv4), IP version 6 (IPv6), or any other IP version. The IP address may be a public IP address or a private IP address. While described in terms of an IP address, another type of network address, such as a MAC address, may alternatively be used.

Access device 220 may include one or more network devices, or other types of computation or communication devices. Access device 220 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In some implementations, access device 220 may include a wireless interface to interact with user device 210 and/or network 230. In some implementations, access device 220 may include a wired interface, such as an Ethernet or optical cable interface, to interact with user device 210 and/or network 230. Access device 220 may be part of user device 210, or may be a separate device than user device 210.

Access device 220 may utilize point-to-point protocol on Ethernet (hereinafter referred to as "PPPoE"), dynamic host configuration protocol (hereinafter referred to as "DHCP"), and/or any other type of protocol, to obtain an IP address for user device 210.

Network 230 may include one or more wired and/or wireless networks. For example, network 230 may include a cellular network, a public land mobile network (PLMN), a second generation (2G) network, a third generation (3G) network, a fourth generation (4G) network, a fifth generation (5G) network and/or another network. Additionally, or alternatively, network 230 may include a local area network (LAN), a wide area network (WAN), a metropolitan network (MAN), a telephone network (e.g., the Public Switched Telephone Network (PSTN)), a managed IP network, a virtual private network (VPN), an ad hoc network, an intranet, the Internet, a satellite network, a GPS network, a fiber optic-based network, and/or a combination of these or other types of networks. Additionally, or alternatively, network 230 may include a radio access network (RAN), such as a long term evolution (LTE) network, that may include a variety of components to facilitate mobile communications, such as antennas, base stations, mobile switching centers, and interfaces with PSTNs and/or packet data servicing nodes (PDSNs).

GWR 240 may include one or more network devices that gather, process, search, and/or provide information in a manner described herein. GWR 240 may include one or more data processing and/or traffic transfer devices, such as a gateway, a router, a modem, a switch, a firewall, a NIC, a hub, a bridge, a proxy server, an OADM, or some other type of device that processes and/or transfers traffic. GWR 240 may, for example, provide connectivity of user device 210 to network 230 by assigning an IP address for user device 210. In some implementations, GWR 240 may access a list of IP addresses, from which an IP address may be assigned, by GWR 240, to user device 210.

AAA server 250 may include one or more server devices, network devices, or other types of computation or communication devices, that gather, process, search, store, and/or provide information in a manner described herein. For example, AAA server 250 may manage, update, and/or store, in a memory associated with AAA server 250, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, AAA server 250 may include a device that performs authentication, authorization, and/or accounting (AAA) operations associated with a communication session with user device 210. In some implementations, AAA server 250 may access a list of IP addresses, from which an IP address may be assigned by AAA server 250 to user device 210, rather than being assigned by GWR 240.

Mapping memory 260 may include one or more memory, or network, devices that gather, process, store and/or provide information described herein. Mapping memory 260 may store a name for user device 210 along with an associated IP address. Mapping memory 260 may assign an amount of time for which an IP address may be used by user device 210. Mapping memory 260 may store and relate the amount of time along with the name and the IP address for user device 210. Mapping memory 260 may include a time counter mechanism that determines when the amount of time expires.

In one example implementation, mapping memory 260 may be a part of GWR 240. In another example implementation, mapping memory 260 may be a part of AAA server 250. In another example implementation, mapping memory 260 may be a separate device. In another example implementation, mapping memory 260 may be stored in memory, associated with another device or a group of devices, separated from, or in combination with the memory associated with GWR 240 and/or AAA server 250.

Figure 3:
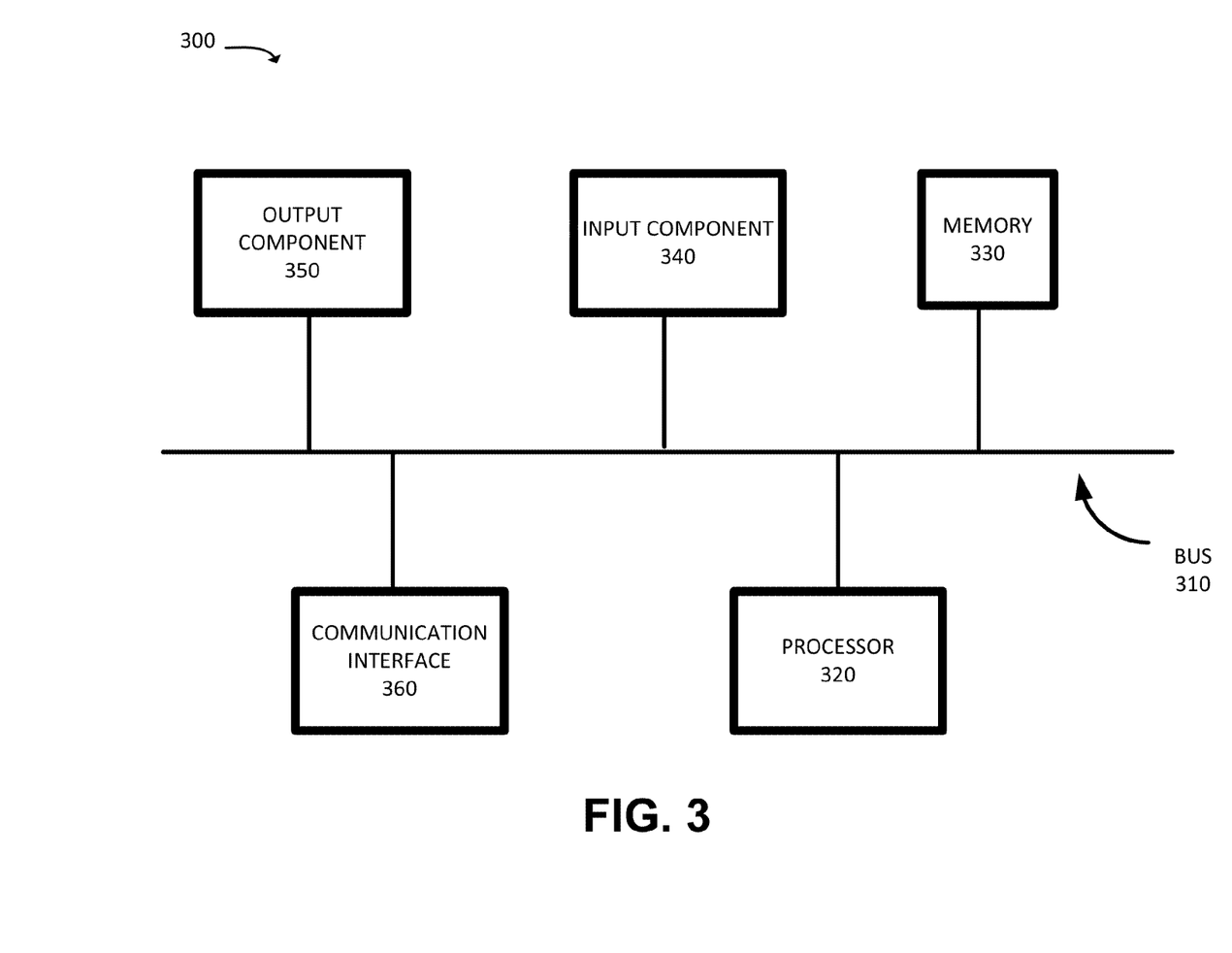
FIG. 3 is a diagram of example components of one or more devices of FIGS. 1 and 2.

FIG. 3 is a diagram of example components of a device 300. Device 300 may correspond to user device 210, access device 220, GWR 240, AAA server 250, mapping memory 260, and/or device 270. Additionally, or alternatively, each of user device 210, access device 220, GWR 240, AAA server 250, mapping memory 260, and/or device 270 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array ("FPGA"), or application specific integrated circuit ("ASIC")) that may interpret and execute instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 280 and/or devices connected to network 230.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4A:
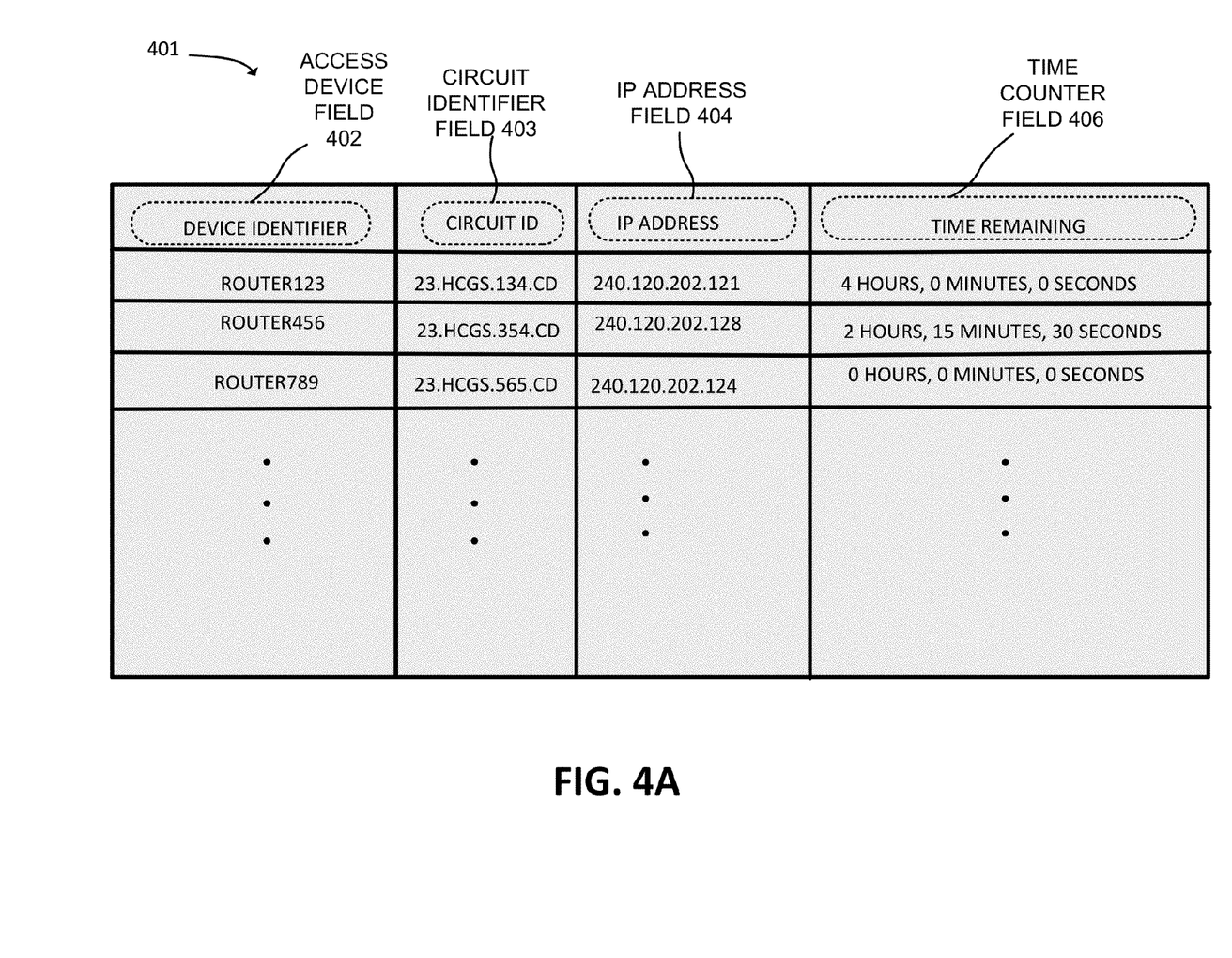
FIG. 4A is a diagram of an example mapping memory.

FIG. 4A is a diagram of an example data structure 401 that may be stored by mapping memory 260. Each row of data structure 401 may correspond to an IP address assigned to a user device, such as user device 210.

Data structure 401 may include a collection of fields, such as access device field 402, circuit identifier field 403, IP address field 404, and time counter field 406. Although FIG. 4A shows example fields 402-406, in other implementations, data structure 401 may include fewer fields, different fields, additional fields, or differently arranged fields than depicted in FIG. 4A. Additionally, or alternatively, one or more fields of data structure 401 may include information described as being included in one or more other fields of data structure 401.

Access device field 402 may store a name and/or identifier information that uniquely identifies a particular access device 220. For example, access device field 402 may include an identifier for a particular access device 220 (such as Router123). The particular access device 220 may be associated with user device 210 (e.g., by using a circuit identifier associated with a subscriber who uses user device 210 to receive network services via access device 220 or by using another type of identifier or address associated with user device 210 that is receiving network services via access device 220).

Circuit identifier field 403 may store identifier information that uniquely identifies a particular user device 210 (such as 23.HCGS.134.CD). The particular user device 210 may be associated with a particular access device 220 described in access device field 402.

IP address field 404 may store information that identifies a particular IP address that is associated with access device 220. For example, IP address field 404 may store an IP address (e.g., 240.120.202.121) for access device 220 (ROUTER123). The IP address in IP address field 404 may be associated with access device 220 and/or user device 210.

Time counter field 406 may store information that identifies an amount of time that the IP address, identified in IP address field 404, may be used by access device 220 (associated with user device 210) identified in access device field 402. The amount of time may be set by mapping memory 260 when the IP address is received by mapping memory 260. In one example implementation, mapping memory 260 may set an amount of time (e.g., three hours) and the amount of time may be counted backwards (e.g., by a time counter mechanism in mapping memory 260) to zero. When the amount to time reaches zero, the amount of time expires and a new IP address may be assigned to access device 220 and the associated circuit identifier for user device 210. Thus, user device 210 may connect to the network using the IP address via access device 220.

In another example implementation, mapping memory 260 may set a limit on the amount of time (e.g., three hours) and count the time from zero to the limit. When the amount of time reaches the limit, the amount of time expires and a new IP address may be assigned to access device 220 and the associated user device 210.

In the example, shown in FIG. 4A, the remaining amount of time associated with the IP address (e.g., 2410.120.202.128) for access device 220 (associated with the circuit identifier for user device 210), associated with the name/identifier Router456, is two hours, 15 minutes, and 30 seconds. In one example implementation, the time counter mechanism, in mapping memory 260, may count the amount of time (two hours, 15 minutes, and 30 seconds) down to zero. When the time reaches zero, a new IP address may be assigned to Router456. In another example implementation, the time counter mechanism in mapping memory 260 may count the amount of time (two hours, 15 minutes, and 30 seconds) up to a time limit (e.g., four hours). When the amount of time reaches four hours, a new IP address may be assigned to Router456 which may allow user device 210 to connect with the network.

Figure 4B:
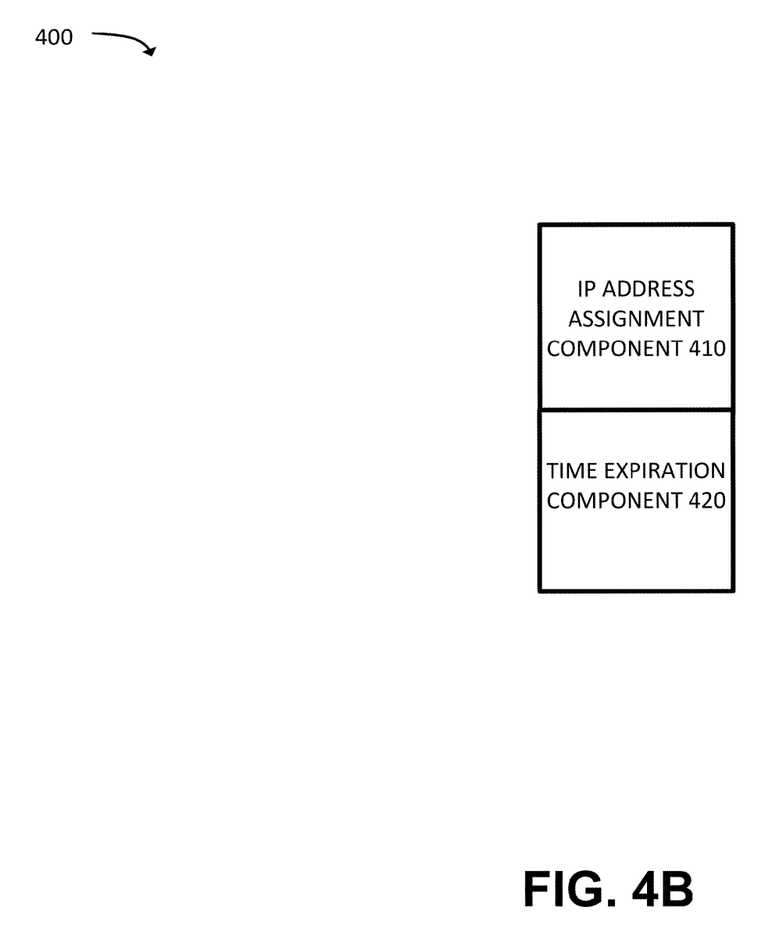
FIG. 4B is a diagram of example functional components of a device in FIG. 2.

FIG. 4B is a diagram of example functional components of a device 400 that may correspond to GWR 240, AAA server 250, or another network device. As illustrated, device 400 may include an IP address assignment component 410, and a time expiration component 420. Each of functional components 410-420 may be implemented using one or more components of device 300 or by one or more devices 300. One of the functional components in FIG. 4 may perform one or more tasks described as being performed by the other functional component of FIG. 4.

GWR 240 and/or AAA server 250 may individually include all of the functional components depicted in FIG. 4, or the functional components depicted in FIG. 4 may be distributed singularly or duplicatively in any manner between the devices illustrated in FIG. 2. In some implementations, GWR 240 and/or AAA server 250 may include other functional components (not shown) that aid in assigning and/or storing IP addresses associated with user device 210.

IP address assignment component 410 may assign an IP address for user device 210 from a list, of IP addresses, in GWR 240, AAA server 250, or any other memory and/or network device. IP address assignment component 410 may receive a request for an IP address, for user device 210, from access device 220, to connect network 230. Alternatively, IP address assignment component 410 may receive a request for an IP address, for user device 210, from time expiration component 420.

IP address assignment component 410 may assign an amount of time associated with the IP address for user device 210. Alternatively, IP address assignment component 410 may send the IP address to mapping memory 260, and mapping memory 260 may assign an amount of time associated with the IP address for user device 210 to access network 230.

Time expiration component 420, may determine when to request IP address assignment component 410 to assign a new IP address to user device 210 in situations (described below) when the amount of time, associated with the IP address, expires.

For example, time expiration component 420 may determine that user device 210 is idle after receiving a message from mapping memory 260, that the amount of time (associated with the IP address being used by user device 210) is expired. Time expiration component 420 may determine that user device 210 is idle, when GWR 240 does not receive any messages, associated with the IP address, from user device 210 for a period of time. Time expiration component 420 may be configured to determine the period of time (e.g., one second, five seconds, five minutes, etc.) that user device 210 can be idle before a new IP address may be assigned to user device 210.

With the amount of time expired and user device 210 is idle, time expiration component 420 may request IP address assignment component 410 to assign a new IP address for user device 210 to access network 230.

Alternatively, time expiration component 420 may receive a request, from user device 210 (e.g., via access device 220), for a previously assigned IP address after the amount of time (associated with the previously assigned IP address) is expired. With the amount of time expired, time expiration component 420 may request IP address assignment component 410 to assign a new IP address for user device 210 to access network 230.

Figure 5:
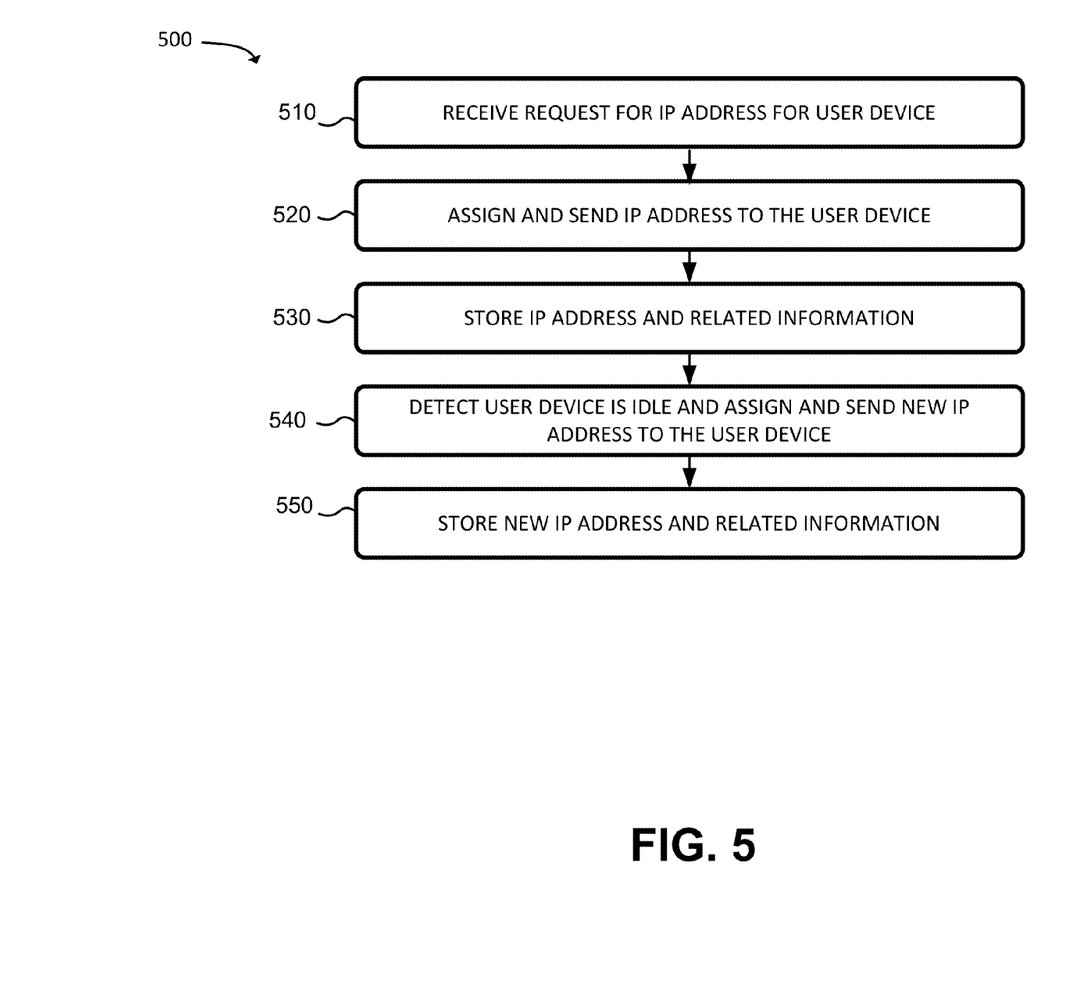
FIG. 5 is a flow chart of an example process for assigning an IP address.

FIG. 5 is a flow chart of an example process 500 for assigning an IP address. In one implementation, process 500 may be performed by GWR 240. In another implementation, one or more blocks of process 500 may be performed by one or more other devices, such as AAA server 250.

Process 500 may include receiving a request for an IP address for a user device (block 510). For example, GWR 240, or AAA server 250, may receive a request for an IP address from user device 210 via access device 220, for user device 210 to access network 230.

In one example implementation, user device 210, using access device 220, may send a request for an IP address to GWR 240. The request may include a name, or identifier, for user device 210. GWR 240 may receive the request. GWR 240 may send a message to AAA server 250, which includes the name for user device 210, to request AAA server 250 to authenticate user device 210. AAA server 250 may authenticate (e.g., determine user device 210 is authorized to access network 230) user device 210 and send a message to GWR 240 that user device 210 is authenticated. GWR 240 may receive the message from AAA server 250.

In another example implementation, user device 210, using access device 220, may send a request for an IP address to AAA server 250. User device 210, via access device 220, may send the request to GWR 240. The request may include a name, or identifier, for user device 210. GWR 240 may receive the request from user device 210, via access device 220. GWR 240 may determine that the request is for an IP address which is to be provided by AAA server 250. GWR 240 may send the request to AAA server 250. AAA server 250 may receive the request. AAA server 250 may authenticate (e.g., determine user device 210 is authorized to access network 230) user device 210.

Process 500 may include assigning and sending an IP address to the user device (block 520). For example, GWR 240, or AAA server 250, may assign and send an IP address for user device 210.

In one example implementation, GWR 240 may assign an IP address to user device 210. GWR 240 (or another network or memory device) may have a list of available IP addresses from which to assign an IP address to user device 210. IP address assignment component 410, in GWR 240, may assign an IP address to user device 210 from the list of available IP addresses. GWR 240 may send the IP address, via access device 220, to user device 210. User device 210 may use the IP address to access network 230.

In another example implementation, AAA server 250 may assign an IP address to user device 210. GWR 240 may send the request, for the IP address, to AAA server 250, so that AAA server 250 may assign an IP address to user device 210. AAA server 250 (or another network or memory device) may have a list of available IP addresses from which to assign an IP address to user device 210. IP address assignment component 410, in AAA server 250, may assign an IP address to user device 210 from the list of available IP addresses. AAA server 250 may send the IP address, via access device 220 and GWR 240, to user device 210. User device 210 may use the IP address to access network 230.

Process 500 may include storing the IP address and related information for the user device (block 530). For example, GWR 240, or AAA server 250, may send the IP address and name (for user device 210) to be stored by mapping memory 260.

In one example implementation, GWR 240 may send the IP address along with the name (for user device 210) to mapping memory 260. IP address assignment component 410, in GWR 240, may also assign an amount of time associated with the IP address, and send the amount of time information along with the IP address to mapping memory 260. Alternatively, upon receiving the IP address and name from GWR 240, mapping memory 260 may assign an amount of time (e.g., two, three, or four hours) to the IP address.

Mapping memory 260 may store the IP address, name and the amount of time information, as described with regard to FIG. 4A. Using a time counter mechanism, mapping memory 260 may begin counting the amount of time (described with regard to FIG. 4A) until the amount of time expires.

In another example implementation, AAA server 250 may send the IP address along with the name (for user device 210) to mapping memory 260. IP address assignment component 410, in AAA server 250, may assign an amount of time associated with the IP address, and send the amount of time information along with the IP address to mapping memory 260. Alternatively, upon receiving the IP address and name from AAA server 250, mapping memory 260 may assign an amount of time (e.g., two, three, or four hours) to the IP address.

Mapping memory 260 may store the IP address, name and the amount of time information, as described with regard to FIG. 4A. Using a time counter mechanism, mapping memory 260 may begin counting the amount of time (described with regard to FIG. 4A) until the amount of time expires.

Process 500 may include detecting that the user device is idle and assigning a new IP address (block 540). For example, GWR 240 may determine whether user device 210 is idle, after receiving a message from mapping memory 260 that the amount of time (associated with the IP address for user device 210) is expired. With user device 210 idle and the amount of time expired, GWR 240, or AAA server 250, may assign a new IP address to user device 210 and/or access device 220.

Time expiration component 420, in GWR 240, may determine that user device 210 is idle. For example, time expiration component 420 may determine that user device 210 is idle, when GWR 240 does not receive any messages (associated with the IP address assigned in block 520) from user device 210, for a period of time. Time expiration component 420 may determine the period of time (e.g., one second, five seconds, five minutes, etc.) that user device 210 needs to be idle before a new IP address may be assigned to user device 210 and/or access device 220.

Additionally, time expiration component 420, in GWR 240, may receive a message (before GWR 240 determines whether user device 210 is idle) from mapping memory 260 that the amount of time, associated with the IP address, is expired.

In one example implementation, with the amount of time expired and user device 210 being idle for a period of time, time expiration component 420 (in GWR 240) may send a message to IP address assignment component 410 (in GWR 240). The message may include a request to IP address assignment component 410 to assign a new IP address for user device 210. IP address assignment component 410 may assign a new IP address by retrieving an IP address from a list of IP addresses in GWR 240 (or any other network or memory device). IP address assignment component 410 may send the new IP address to user device 210, via access device 220. User device 210 may use the new IP address to access network 230.

In another example implementation, with the amount of time expired and user device 210 being idle for a period of time, time expiration component 420 (in GWR 240) may send a message to IP address assignment component 410 (in AAA server 250). The message may include a request to IP address assignment component 410 to assign a new IP address to user device 210. IP address assignment component 410 may assign a new IP address by retrieving an IP address from a list of IP addresses in AAA server 250 (or any other network or memory device). IP address assignment component 410 may send the new IP address to user device 210, via access device 220 and GWR 240. User device 210 may use the new IP address to access network 230.

Process 500 may include storing the new IP address and related information of the user device (block 550). For example, GWR 240, or AAA server 250, may send the new IP address along with the name (for user device 210) to be stored by mapping memory 260.

In one example implementation, GWR 240 may send the new IP address along with other information (for user device 210) to mapping memory 260, described with regard to block 530, in FIG. 5. The assignment of the amount of time, associated with the new IP address, is described with regard to block 530 in FIG. 5. Upon receiving the new IP address, mapping memory 260 may assign and store IP address and amount of time information, described with regard to block 530 in FIG. 5.

In another example implementation, AAA server 250 may send the new IP address along with other information (for user device 210) to mapping memory 260, described with regard to block 530, in FIG. 5. The assignment of the amount of time, associated with the new IP address, is described with regard to block 530 in FIG. 5. Upon receiving the new IP address, mapping memory 260 may assign and store IP address and amount of time information, described with regard to block 530 in FIG. 5.

Figure 6:
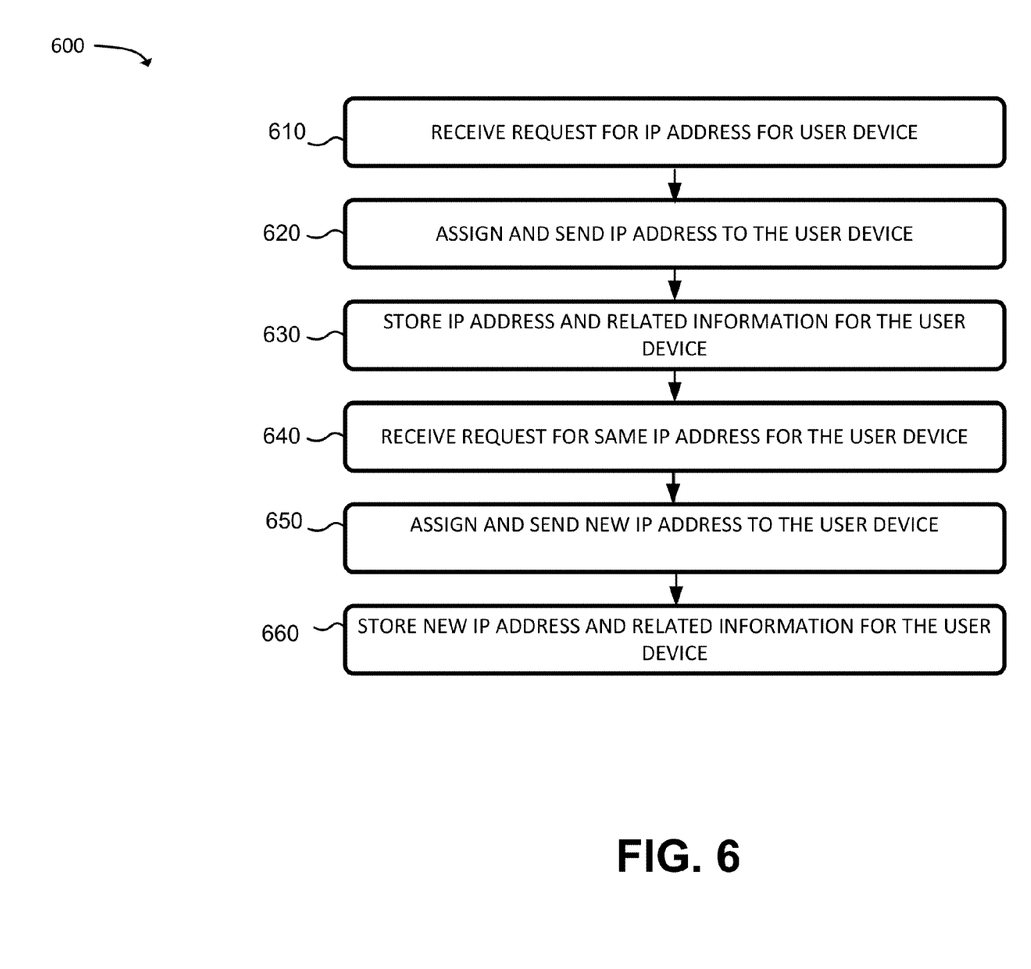
FIG. 6 is a flow chart of an example process for assigning an IP address.

FIG. 6 is a flow chart of an example process 600 for assigning an IP address. In one implementation, process 600 may be performed by AAA server 250. In another implementation, one or more blocks of process 600 may be performed by one or more other devices, such as GWR 240.

Process 600 may include receiving a request for an IP address for a user device (block 610). For example, GWR 240, or AAA server 250, may receive a request for an IP address for user device 210.

In one example implementation, user device 210, using access device 220, may send a request for an IP address to GWR 240, described with regard to block 510 in FIG. 5, and GWR 240 may forward the request to AAA server 250.

In another example implementation, user device 210, using access device 220, may send a request for an IP address to AAA server 250, described with regard to block 510 in FIG. 5.

Process 600 may include assigning and sending an IP address for the user device (block 620). In one example implementation, GWR 240 may assign and send an IP address for user device 210, described with regard to block 520 in FIG. 5. In another example implementation, AAA server 250 may assign and send an IP address for user device 210, described with regard to block 520 in FIG. 5.

Process 600 may include storing the IP address and related information for the user device (block 630). For example, GWR 240, or AAA server 250, may send the IP address and name (for user device 210) to be stored by mapping memory 260.

In one example implementation, GWR 240 may send the IP address along with other information (for user device 210) to mapping memory 260, described with regard to block 530, in FIG. 5. The assignment of the amount of time, associated with the IP address, is described with regard to block 530 in FIG. 5. Upon receiving the IP address, mapping memory 260 may assign and store IP address along with the amount of time information, described with regard to block 530 in FIG. 5.

In another example implementation, AAA server 250 may send the IP address along with other information (for user device 210) to mapping memory 260, described with regard to block 530, in FIG. 5. The assignment of the amount of time, associated with the IP address, is described with regard to block 530 in FIG. 5. Upon receiving the IP address, mapping memory 260 may assign and store IP address along with the amount of time information, described with regard to block 530 in FIG. 5.

Process 600 may include receiving a request for the same IP address for the user device (block 640). For example, user device 210, using access device 220, may request the same IP address (assigned in block 620).

User device 210 may have been turned back on (or powered on) after being turned off, after being powered down, or after losing power. Being turned (or powered) back on, user device 210 may require an IP address to access network 230. GWR 240 may receive a request from user device 210 (using access device 220) for the IP address previously assigned (in block 620) for user device 210 to access network 230.

In one example implementation, GWR 240 may request AAA server 250 to authenticate user device 210, as described with regard to block 510, in FIG. 5. AAA server 250 may authenticate and send the authentication result to GWR 240, as described with regard to block 510, in FIG. 5. In another example implementation, receiving the request for the previously assigned IP address (in block 620) from user device 210 may indicate to GWR 240 that user device 210 is an authenticated user device that may access network 230.

Process 600 may include assigning and sending a new IP address for the user device (block 650). For example, GWR 240, or AAA server 250, may assign a new IP address for user device 210 after GWR 240 determines that the amount of time, associated with the current IP address, is expired.

Time expiration component 420, in GWR 240, may receive a message from mapping memory 260 that the amount of time, associated with the IP address assigned in block 520, is expired. Time expiration component 420, in GWR 240, may determine that the request for the previously assigned IP address is received after being notified that the amount of time is expired.

In one example implementation, time expiration component 420 may communicate with IP address assignment component 410, in GWR 240, to assign a new IP address to user device 210. IP address assignment component 410 may select a new IP address from the list of IP addresses in GWR 240. IP address assignment component 410 may send the new IP address to user device 210, via access device 220. User device 210 may use the new IP address to access network 230.

In another example implementation, time expiration component 420 may send a message to IP address assignment component 410 in AAA server 250. The message may include a request to IP address assignment component 410 to assign a new IP address to user device 210. IP address assignment component 410 may select a new IP address from the list of IP addresses in AAA server 250. IP address assignment component 410 may send the new IP address to user device 210, via access device 220. User device 210 may use the new IP address to access network 230.

Alternatively, time expiration component 420, in GWR 240, may determine that the request for the previously assigned IP address is received before being notified that the amount of time is expired. In one example implementation, time expiration component 420 may communicate with IP address assignment component 410, in GWR 240, to assign the previously assigned IP address to user device 210. In another example implementation, time expiration component 420 may communicate with IP address assignment component 410, in AAA server 250, to assign the previously assigned IP address to allow user device 210 to access network 230.

Process 600 may include storing the new IP address and the related information for the user device (block 660). For example, GWR 240, or AAA server 250, may send the new IP address along with the name (for user device 210) to be stored by mapping memory 260.

In one example implementation, GWR 240 may send the new IP address along with other information (for user device 210) to mapping memory 260, described with regard to block 530, in FIG. 5. The assignment of the amount of time, associated with the new IP address, is described with regard to block 530 in FIG. 5. Upon receiving the new IP address, mapping memory 260 may assign and store the new IP address and amount of time information, described with regard to block 530 in FIG. 5.

In another example implementation, AAA server 250 may send the new IP address along with other information (for user device 210) to mapping memory 260, described with regard to block 530, in FIG. 5. The assignment of the amount of time, associated with the new IP address, is described with regard to block 530 in FIG. 5. Upon receiving the new IP address, mapping memory 260 may assign and store the new IP address and amount of time information, described with regard to block 530 in FIG. 5.

Figure 7:
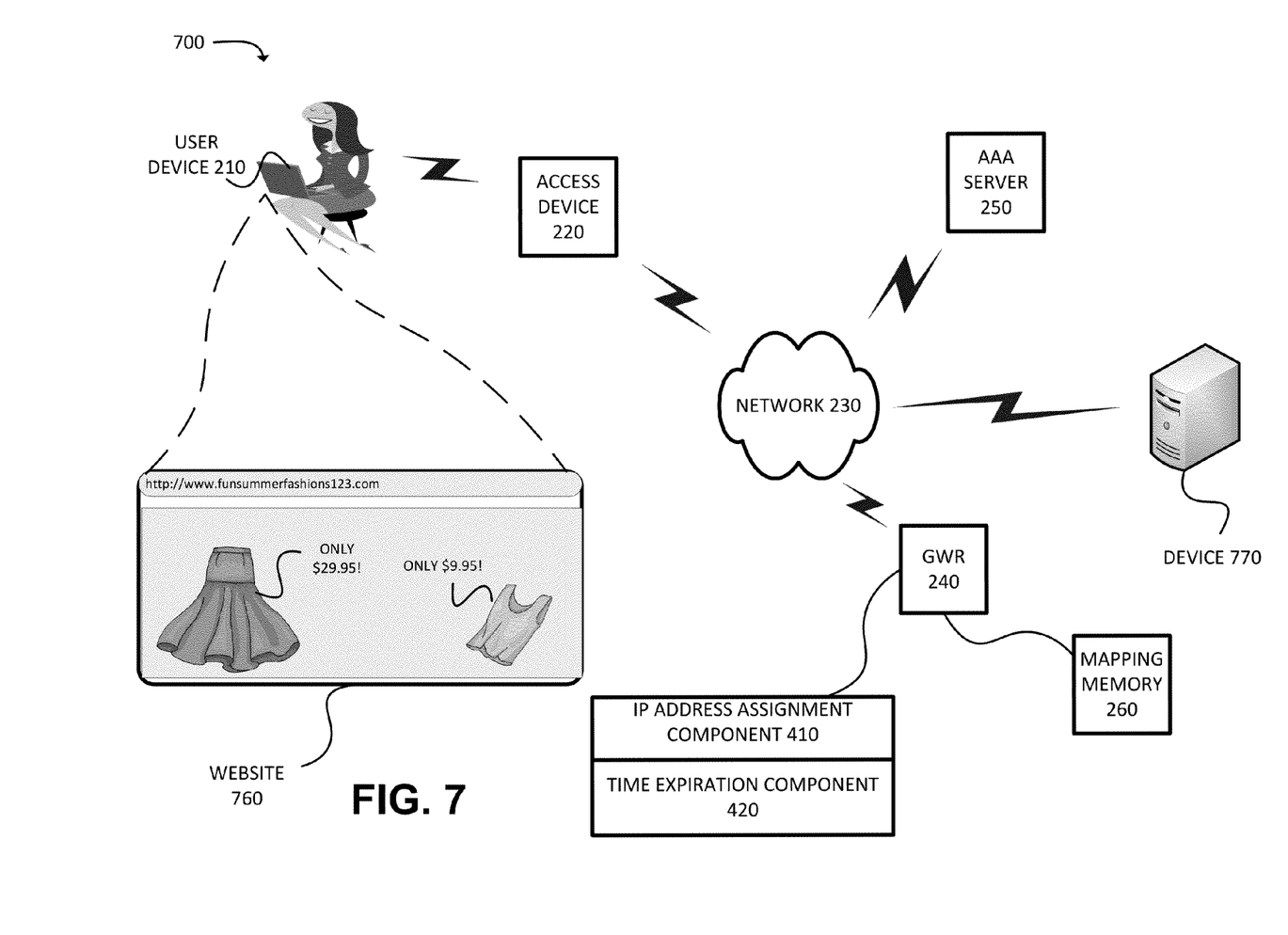
FIG. 7 is a diagram of an example process for assigning an IP address.

FIG. 7 is a diagram of an example 700 of assigning an IP address. FIG. 7 shows user device 210, modem 220, network 230, GWR 240, mapping memory 260, IP address assignment component 410, website 760, and time expiration component 420, device 770. An example of device 770 may correspond to user device 210, described with regard to FIG. 2.

In FIG. 7, a user ("Mary"), of user device 210, would like to access content from website 760 on user device 210 (e.g., a laptop). Assume that Mary has turned on user device 210 at 10:00 a.m. For Mary to access content from website 760 on user device 210, user device 210 may obtain (using PPPoE, DHCP, or any other protocol in access device 220) an IP address. To obtain the IP address for user device 210, user device 210 may connect with GWR 240, via access device 220 and network 230. GWR 240 may receive the request, which includes the name for user device 210.

GWR 240 may require that user device 210 be authenticated before an IP address may be assigned. GWR 240 may send an authentication request to AAA server 250. AAA server 250 may determine that user device 210 is a valid user device that can access network 230. AAA server 250 may send a message to GWR 240 that user device 210 is authenticated. GWR 240 may receive the message from AAA server 250.

With user device 210 authenticated, IP address assignment component 410, in GWR 240, may assign an IP address from a list of IP addresses in GWR 240. GWR 240 may send an IP address to user device 210, via network 230 and access device 220. User device 210 may now access network 230 and allow Mary to access content from website 760 on user device 210.

GWR 240 may store the IP address along with the name for user device 210 in mapping memory 260. Mapping memory 260 may also assign an amount of time, associated with the IP address. Assume that the amount of time is five hours. Mapping memory 260 may (using a time counter mechanism) determine when the amount of time expires. When the amount of time expires, a new IP address may be assigned to user device 10.

By 11:00 a.m., Mary decides to turn off user device 210 and go shopping. At 4:00 p.m., Mary returns home and decides to again access content, from website 760, on user device 210. Mary turns on user device 210. User device 210 again requires an IP address to allow user device 210 to connect, via network 230, to website 760.

To again obtain an IP address, user device 210 connects to GWR 240, via access device 220 and network 230. Since user device 210 had connected previously (at 10:00 a.m.) to network 230, access device 220 may attempt to obtain the same IP address (used earlier in the day) for user device 210. GWR 240 may receive the request for the same IP address assigned at 9:00 a.m. Time expiration component 420, in GWR 240, may receive a message from mapping memory 260, that the amount of time is expired. Time expiration component 420 may determine that a new IP address is to be assigned to user device 210. Time expiration component 420 may send a message to IP address assignment component 410. The message may include a request for IP address assignment component 410 to assign a new IP address for user device 210. IP address assignment component 410, in GWR 240, may assign a new IP address to user device 210 from a list of IP addresses stored by GWR 240.

GWR 240 may send the new IP address to user device 210, via network 230 and access device 220. With the new IP address, Mary may again access content, on user device 210, from website 760. While Mary is accessing content from website 760, on user device 210, device 770 may attempt to determine Mary's location. Since user device 210 is using a new IP address, every five hours, device 770 may not be able to perform IP address matching and determine Mary's location and/or Mary's identity. Mary may decide to maintain her privacy, and does not give permission to device 770, or the owners of device 770, to obtain information to determine Mary's location and/or identity.

Figure 8:
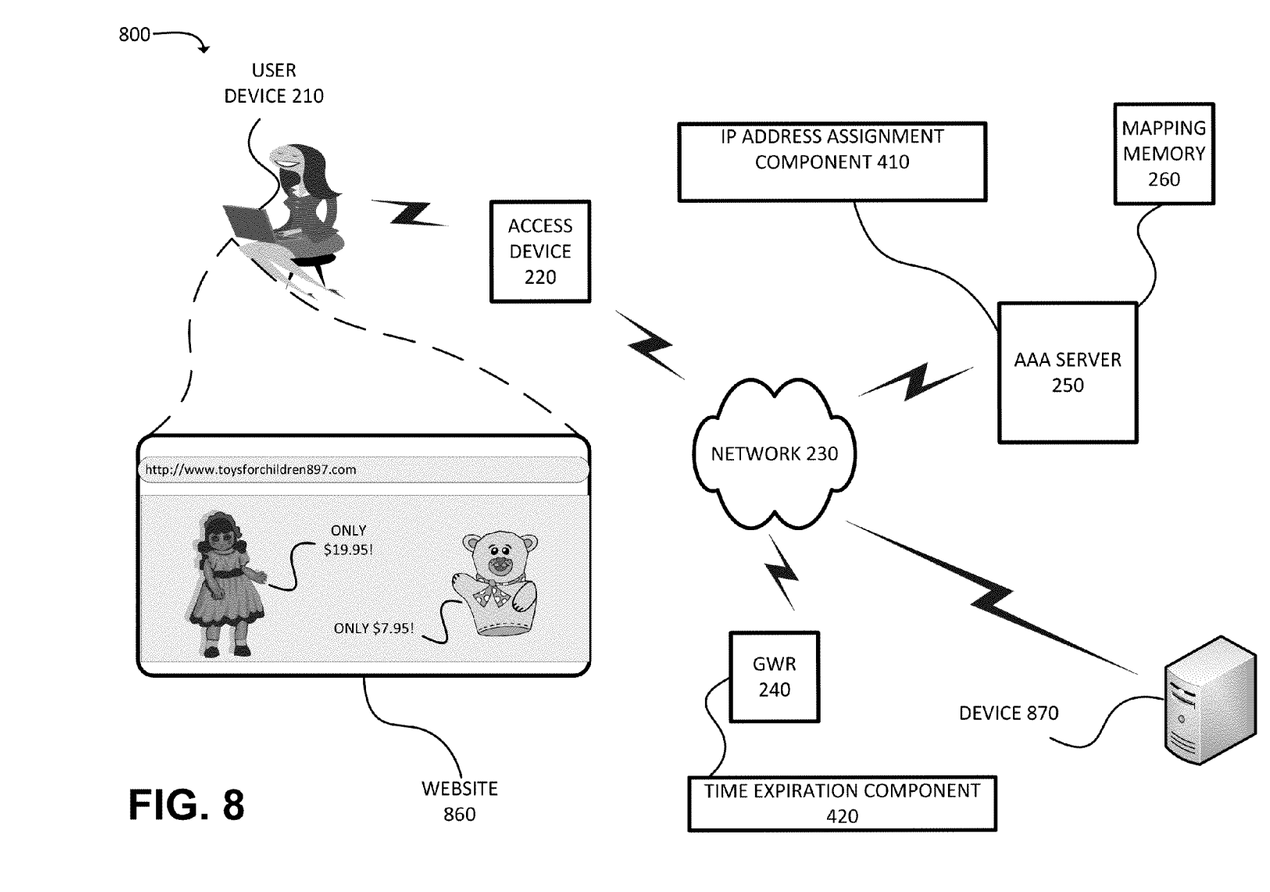
FIG. 8 is a diagram of an example process for assigning an IP address.

FIG. 8 is a diagram of an example 800 of assigning an IP address. FIG. 8 shows user device 210, access device 220, network 230, GWR 240, AAA server 250, mapping memory 260, IP address assignment functional component 410, time expiration component 420, website 860, and device 870. An example of device 870 may correspond to user device 210, described with regard to FIG. 2.

In FIG. 8, a user ("Jane"), of user device 210, would like to access content from website 860 on user device 210. Assume that Jane has turned on user device 210 at 10:00 a.m. For Jane to access content from website 860 on user device 210, user device 210 may require an IP address. To obtain an IP address for user device 210, user device 210 connects with GWR 240, via access device 220 and network 230. Access device 220, may request an IP address for user device 210. GWR 240 may receive the request, which includes the name for user device 210. GWR 240 sends the request to AAA server 250. AAA server 250 may authenticate user device 210, by determining that user device 210 is a valid user device that may use network 230. AAA server 250 may then assign an IP address from a list of IP addresses stored in AAA server 250. AAA server 250 may store the IP address and the associated name for user device 210 in mapping memory 260. Mapping memory 260 may assign an amount of time associated with the IP address. Assume that the amount of time is four hours. Mapping memory 260 may (using a time counter mechanism) determine when the amount of time expires. When the amount of time expires, a new IP address may be assigned to user device 210.

AAA server 250 may send the IP address to GWR 240. GWR 240 may send the IP address to user device 210, via network 230 and access device 220. User device 210 may now connect to network 230 and allow Jane to access content from website 860 on user device 210.

By 2:15 p.m., Jane is not actively using her laptop to browse websites or any activity across network 230. The laptop may still be on, but the laptop is considered to be idle because the laptop is not actively using the IP address to access network 230.

Time expiration component 420 (in GWR 240) may determine (from receiving a message from mapping memory 260), that the amount of time has expired. Time expiration component 420 may also determine that user device 210 is idle. Based on these two factors, time expiration component 420 may send a message to IP address assignment component 410, in AAA server 250. The message may include a request for IP address assignment component 410 to assign a new IP address to user device 210. IP address assignment component 410 may assign a new IP address, for user device 210, from the list of IP addresses in AAA server 250.

Assume that AAA server 250 is located in New York, and Jane is located in Chicago. AAA server 250 may send the new IP address to GWR 240. GWR 240 may send the new IP address to user device 210, via network 230 and access device 220. AAA server 250 may store the new IP address and the new amount of time for user device 210 in mapping memory 260. User device 210 may now connect to network 230 that will allow Jane to continue to access website 860 without any interruption.

While Jane is browsing website 860, device 870 may attempt to determine Jane's location. Since user device 210 is using a new IP address, every four hours, the changing of IP addresses may prevent device 870 from performing IP address matching to determine Jane's location. Also, because the new IP address is assigned by AAA server 250 (located in New York), device 870 may not be able conduct a trace route to determine that Jane is located in Chicago. This is because the IP address has a configuration that indicates that it is assigned in New York. Thus, device 870 may not even be able to determine the regional area (metro Chicago area) in which Jane is located.

However, Jane may provide permission for device 870 to receive the current IP address assigned to user device 210. Thus, device 870 may receive the IP address and name for user device 210, from mapping memory 260 at the time an IP address is assigned to user device 210. Each time the IP address changes for user device 210, device 870 may receive the current IP address for user device 210. In return for the IP address and user device 210 identifier information, the owners of device 870 may be charged a fee.

A system and method, described herein, may assign an IP address, for a user device, that may be used for an amount of time until the amount of time expires. In some implementations, after the amount of time expires, a new IP address may be assigned to the user device.

The foregoing description of implementations provides illustration and description, but is not intended to be exhaustive or to limit the implementations to the precise form disclosed. Modifications and variations are possible in light of the above disclosure or may be acquired from practice of the implementations.

While series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving, by a network device, a request from a user device for an IP address;
   assigning, by the network device, the IP address to the user device;
   assigning, by the network device, an amount of time that the IP address may be used by the user device, the amount of time being finite;
   sending, by the network device, the IP address to the user device;
   determining, by the network device, that the amount of time has expired;
   determining, by the network device, that the user device is idle for a particular period of time after determining that the amount of time has expired;
   assigning, by the network device, a new IP address to the user device, after determining that the user device is idle for the particular period of time; and
   sending, by the network device, the new IP address to the user device.

2. The method of claim 1, further comprising:
   sending, by the network device, the IP address, the amount of time, and a name for the user device to a memory device,
   the memory device associating the name for the user device with the IP address and the amount of time for the IP address.

3. The method of claim 1, where determining that the user device is idle includes:
   determining that the user device is not sending message for the particular period of time.

4. The method of claim 1, further comprises:
   assigning, by the network device, a new amount of time that the new IP address may be used by the user device.

5. A method comprising:
   receiving, by a network device, a request from a user device for an IP address;
   assigning, by the network device, the IP address to the user device;
   assigning, by the network device and to the IP address, an amount of time that the IP address may be used by the user device;
   sending, by the network device, the IP address to the user device;
   determining, by the network device, that the amount of time has expired;
   receiving, by the network device and when the user device turns on, a second request from the user device, for the IP address previously assigned to the user device, after the amount of time that the IP address may be used by the user device has expired;
   assigning, by the network device, a new IP address to the user device after the amount of time has expired; and
   sending, by the network device, the new IP address to the user device.

6. The method of claim 5, further comprising:
   sending, by the network device, the IP address and the new IP address, for the user device, and a name for the user device for storage at a memory device.

7. The method of claim 5, further comprising:
   preventing, by the network device, the user device from receiving the IP address after the amount of time has expired.

8. The method of claim 5, where assigning the IP address to the user device includes:
   sending an authentication request to a server, the server authenticating that the user device is authorized to access a network;
   receiving an authentication result, from the server, that the user device is authorized to access the network; and
   assigning the IP address to the user device based on receiving the authentication result.

9. The method of claim 5, further comprising:
   assigning, by the network device, a new amount of time that the new IP address may be used by the user device.

10. A system comprising:
    a network device to:
      receive, from a user device, a request for an IP address;
      assign the IP address to the user device;
      assign an amount of time that the IP address may be used by the user device;
      send the IP address to the user device;
      determine that the amount of time has expired;
      determine that the user device is idle for a particular period of time after determining that the amount of time has expired;
      assign a new IP address to the user device after determining that the user device is idle for the particular period of time;
      send the new IP address to the user device; and
      assign a new amount of time that the new IP address may be used by the user device.

11. The system of claim 10, where, when assigning the IP address to the user device, the network device is to:
    send information associated with the user device to a server for authenticating that the user device is authorized to access a network;
    receive a message from the server that the user device is authorized to access the network; and
    assign the IP address to the user device based on receiving the message.

12. The system of claim 10, where, when determining that the user device is idle, the network device is to:
    determine that the user device is not sending any messages, through a network, over the particular period of time, with the IP address assigned to the user device.

13. The system of claim 10, where the network device is further to:
    send the IP address, the amount of time, and a name for the user device to a memory device, the memory device associating the name for the user device with the IP address and the amount of time for the IP address.

14. The system of claim 13, where the network device is further to:

receive a message from the memory device that the amount of time has expired.

15. A system comprising: a network device to:
receive a request for an IP address for a user device;
assign the IP address to the user device;
assign an amount of time that the IP address may be used by the user device;
determine that the amount of time that the IP address may be used by the user device has expired;
receive, from the user device and when the user device turns on, a second request, for the IP address previously assigned to the user device, after the amount of time that the IP address may be used by the user device has expired;
assign a new IP address to the user device based on receiving the second request;
send the new IP address to the user device; and
assign a new amount of time that the new IP address may be used by the user device.

16. The system of claim 15, where the network device is further to:
store the IP address, the amount of time, and a name for the user device; and
associate the name for the user device with the IP address and the amount of time.

17. The system of claim 15, where, when assigning the IP address to the user device, the network device is to:
receive a request to authenticate that the user device is authorized to access a network;
authenticate that the user device is authorized to access the network; and
assign the IP address to the user device based on authenticating that the user device is authorized to access the network.

18. The system of claim 15, where the IP address is associated with a geographic region for the network device that is different than a geographic region associated with the user device.

19. The system of claim 15, where, when assigning the IP address and the new IP address to the user device, the network device is to obtain the IP address and the new IP address from a list of IP addresses stored in the network device.

20. The system of claim 15, where, when assigning the IP address and the new IP address to the user device, the network device is to obtain the IP address and the new IP address from a list of IP addresses stored in the network device.

* * * * *